US006072616A

United States Patent [19]
Cohen et al.

[11] Patent Number: 6,072,616
[45] Date of Patent: Jun. 6, 2000

[54] APPARATUS AND METHODS FOR IMPROVING LINEARITY AND NOISE PERFORMANCE OF AN OPTICAL SOURCE

[75] Inventors: Yacov Cohen, Red Bank; Thomas Huntington Wood, Holmdel, both of N.J.

[73] Assignee: Lucent Technologies Inc., Murray Hill, N.J.

[21] Appl. No.: 08/880,385

[22] Filed: Jun. 23, 1997

[51] Int. Cl.[7] .................................................. H04B 10/04
[52] U.S. Cl. .......................................... 359/187; 359/187
[58] Field of Search .................................. 359/180, 187; 372/6, 20, 29, 32

[56] References Cited

U.S. PATENT DOCUMENTS

| | | | |
|---|---|---|---|
| 4,814,791 | 3/1989 | Ohara et al. ............................. | 347/253 |
| 5,073,983 | 12/1991 | Pfizenmayer ............................ | 359/187 |
| 5,077,619 | 12/1991 | Toms ....................................... | 359/187 |
| 5,384,651 | 1/1995 | Van de Voorde et al. .............. | 359/152 |
| 5,450,508 | 9/1995 | Decusatis et al. ....................... | 385/25 |
| 5,457,557 | 10/1995 | Zarem et al. ............................ | 359/121 |
| 5,548,436 | 8/1996 | Ramachandran et al. .............. | 359/187 |
| 5,550,667 | 8/1996 | Krimmel et al. ........................ | 359/180 |

FOREIGN PATENT DOCUMENTS

| | | | |
|---|---|---|---|
| 37405 | 3/1979 | Japan ..................................... | 359/187 |
| 130233 | 7/1985 | Japan ..................................... | 359/187 |

OTHER PUBLICATIONS

T. Iwai et al., "Signal Distortion and Noise in AM–SCM Transmission Systems Employing the Feedforward Linearized MQW–EA External Modulator," IEEE Journal of Lightwave Technology, vol. 13, No. 8, pp. 1606–1612, Aug. 1995.

M. Nazarathy et al., "Progress in Externally Modulated AM CATV Transmission Systems," IEEE Journal of Lightwave Technology, vol. 11, No. 1, pp. 82–105, Jan. 1993.

W.R. Smith et al., "Analysis and Design of Dispersive Interdigital Surface–Wave Transducers," IEEE Transactions on Microwave Theory and Techniques, vol. MTT–20, No. 7, pp. 458–471, Jul. 1972.

*Primary Examiner*—Thomas Mullen

[57] ABSTRACT

The linearity and noise performance of an inexpensive optical signal source are improved using either feedback or feedforward correction techniques. In a feedback embodiment of the invention, a modulation signal, such as a broadband analog CATV signal, is applied to the optical source along with an error signal. The error signal is generated in a feedback path using a high-speed photodiode to detect a portion of the output optical signal generated by the optical source. A delay compensation filter in the feedback path corrects for variations in error signal delay as a function of frequency, such that source nonlinearity and noise may be corrected over a broad bandwidth. In a feedforward embodiment of the invention, an error signal generated from a portion of the output of the optical source is converted to a frequency band outside of the modulation signal bandwidth before being applied to an input of the optical source. A receiver receiving the optical signal detects both the converted error signal and the modulation signal, and uses the detected error signal to correct the detected modulation signal for the nonlinearity and noise effects of the optical source. The invention allows inexpensive optical sources, such as digital-grade DFB laser diodes or Fabry-Perot laser diodes, to be used in place of expensive highly-linear, low-noise sources in analog signal transmission and other important applications.

24 Claims, 4 Drawing Sheets

APPARATUS AND METHODS FOR IMPROVING LINEARITY AND NOISE PERFORMANCE OF AN OPTICAL SOURCE

FIELD OF THE INVENTION

The present invention relates generally to optical signal sources for use in optical signal transmission systems, and more particularly to an optical signal source which utilizes a feedback or feedforward technique to provide improved linearity and noise performance without unduly increasing the cost of the source.

BACKGROUND OF THE INVENTION

In many optical signal transmission applications, it is important for the optical source to exhibit excellent linearity and noise performance. One such application is in high-quality analog optical fiber systems for providing Community Antenna Television (CATV) service. In such a system, an analog CATV signal including several channels of video is modulated onto one or more optical carrier signals for distribution via optical fiber from a cable system head end. Conventional systems for transmitting analog CATV signals over optical fiber generally require highly-linear, low-noise lasers and/or optical modulators. These types of optical signal sources are usually very expensive, and their excessive cost has been a significant impediment to the widespread deployment of fiber-to-the-home transmission systems. The expensive optical signal sources include, for example, analog-grade distributed feedback (DFB) lasers, as well as continuous wave (CW) lasers, such as yttrium aluminum garnet (YAG) and yttrium lanthanum fluoride (YLF) lasers, which require external modulators.

Conventional optical transmission systems are described in, for example, U.S. Pat. No. 5,548,436 entitled "Optical Transmission System" and issued Aug. 20, 1996 to Ramachandran et al., U.S. Pat. No. 5,457,557 entitled "Low Cost Optical Fiber RF Signal Distribution System" and issued Oct. 10, 1995 to Zarem et al., U.S. Pat. No. 5,450,508 entitled "Apparatus and Method for Optical Fiber Alignment Using Adaptive Feedback Control Loop" and issued Sep. 12, 1995 to Decusatis et al., and U.S. Pat. No. 5,384,651 entitled "Optical Transmission System" and issued Jan. 24, 1995 to Van de Voorde et al. Unfortunately, none of these conventional systems are configured to permit a low-cost optical source, such as a digital-grade DFB laser diode or a Fabry-Perot laser diode, to be used in place of an expensive highly-linear, low-noise optical source.

A number of techniques for improving the linearity or noise performance of an optical source are known. These techniques include the use of pre-distortion circuits, and feedforward approaches in which a second optical source is used. However, conventional pre-distortion circuits generally correct for only source nonlinearity, and an alternative mechanism is therefore required to correct for the source noise. Also, pre-distortion circuits generally require numerous critical adjustments which increase the cost and complexity associated with the source. The second optical source used in conventional feedforward approaches not only involves considerable additional cost and complexity, but introduces wavelength control issues.

It is therefore apparent that a need exists for techniques which provide the linearity and noise performance required in analog signal transmission over optical fiber and other important applications, without the excessive cost and complexity associated with conventional highly-linear, low-noise optical sources.

SUMMARY OF THE INVENTION

The present invention improves the linearity and noise performance of an inexpensive optical source using feedback or feedforward techniques. In accordance with a first aspect of the invention, an inexpensive optical source, such as a digital-grade DFB laser diode or a Fabry-Perot laser diode, has its noise and distortion substantially eliminated by feedback. The optical signal source is provided with a feedback path which corrects for nonlinearity and noise-induced variations in the source output. A modulation signal, such as a broadband analog CATV signal, is applied to the optical source along with a broadband feedback signal. The broadband feedback error signal is generated using a high-speed photodiode in the feedback path to detect a portion of the output optical signal generated by the optical source. The broadband feedback error signal is passed through a delay compensation filter to correct for group delay variations across its bandwidth, and then applied to an input of the optical source to correct source nonlinearity and noise. This aspect of the invention is also particularly well-suited for use with digital quadrature-amplitude modulation (QAM) signals, digital n-level vestigial sideband (VSB) signals, and other digital modulation signals which have a non-constant modulation envelope.

In an illustrative embodiment of the invention using the above-described feedback technique, a high-speed photodiode is utilized in a closed feedback loop as a monitoring device to monitor the output of an inexpensive laser diode. The high-speed photodiode is generally substantially more linear than the inexpensive laser diode, and therefore may be used to generate an error signal which can be used to improve the linearity of the laser diode. The high-speed diode may have a gain-bandwidth product greater than about 500 MHz, such that the operating bandwidth of the laser diode is substantially increased, while its linearity and noise performance are improved. The feedback loop includes a delay compensation filter which compensates for group delay variations in the feedback error signal across a broad bandwidth.

A second aspect of the invention relates to the use of a feedforward technique to improve the linearity and noise performance of an inexpensive optical source. An error signal generated by monitoring the output of the optical source is converted to a frequency band outside of the modulation signal bandwidth before being applied to an input of the optical source. A receiver receiving the optical signal then detects both the converted error signal and the modulation signal, and uses the detected error signal to correct the detected modulation signal for nonlinearity and noise effects of the optical source.

An illustrative embodiment of this second aspect of the invention includes an optical signal transmitter in which the output of the high-speed photodiode is first low pass filtered, and then applied to a first signal combiner which also receives a coupled portion of the input modulation signal. The first signal combiner generates an error signal by subtracting the output of the lowpass filter and the coupled portion of the modulation signal. The error signal is then applied to an input of a mixer which mixes the error signal with a carrier signal generated by a local oscillator in order to convert the error signal to a frequency band outside the modulation signal frequency band. The converted error signal is combined with the modulation signal in a second signal combiner, such that both the modulation signal and the error signal are applied to the optical source. An output optical signal generated by such a source thus serves as an optical carrier for both the modulation signal and the error signal. The resulting optical signal is detected in a receiver, and the modulation signal portion and error signal portion of the detected signal are separately processed to recover the respective modulation and error signals. The error signal is then used in the receiver to correct the effects of source nonlinearity and noise on the modulation signal. An optical signal transmission system in accordance with the invention includes the above-described transmitter and at least one receiver, and an optical distribution network for distributing an optical signal from the transmitter to the receiver. The distribution network may include passive splitters, multiplexers, demultiplexers and other types of optical signal routers. Multiple optical signals may be routed within the transmission system using multiple transmitters in conjunction with well-known wavelength-division multiplexing (WDM) techniques.

An optical source configured in accordance with the present invention can provide linearity and noise performance comparable to that heretofore provided only by substantially more complex and expensive optical sources. The invention thus allows inexpensive optical sources, such as digital-grade DFB laser diodes or Fabry-Perot laser diodes, to be used in place of expensive highly-linear, low-noise sources in analog CATV signal transmission and other important applications, without undermining the linearity and noise performance of the system. Compared to conventional pre-distortion circuits, which generally correct for only source nonlinearity, the above-described feedback and feedforward techniques correct for both nonlinearity and source noise while avoiding the numerous critical adjustments required in many predistortion circuits. Compared with other feedforward approaches, the techniques of the invention avoid the need for a second optical source and any wavelength-control issues associated with a second source. These and other features and advantages of the present invention will become more apparent from the accompanying drawings and the following detailed description.

DETAILED DESCRIPTION OF THE INVENTION

The present invention will be illustrated below in conjunction with exemplary optical signal sources and signal transmission systems. It should be understood, however, that the invention is not limited to use with any particular type of optical signal source or system, but is instead more generally applicable to any optical signal transmission system in which it is desirable to improve the linearity and noise performance of the optical source without unduly increasing its cost and complexity. Moreover, the invention is suitable for use in many applications other than the illustrative optical fiber-based analog signal transmission system to be described below, including digital signal transmission applications. For example, the invention is particularly well-suited for use with digital quadrature-amplitude modulation (QAM) signals, digital n-level vestigial sideband (VSB) signals, and other digital modulation signals which have a non-constant modulation envelope.

The term "optical source" as used herein is intended to include digital-grade DFB laser diodes, Fabry-Perot laser diodes and any other source capable of generating an optical signal. An "inexpensive" optical source is an optical source, such as a digital-grade DFB laser diode or Fabry-Perot laser diode, which is generally less complex and therefore less costly than a highly-linear, low-noise optical source, such as an analog-grade DFB laser, utilized in a conventional optical signal transmission system. The term "feedback" refers generally to the process of supplying an error signal generated from an optical source output to an input of the optical source. The term "feedforward" as used herein refers generally to the process of generating an error signal from the output of an optical source, and supplying it to a receiver for use in correcting a signal received from the optical source. The terms "convert" or "converter" in the context of error signal frequency conversion are intended to encompass both upconversion and downconversion of the error signal. For example, although the illustrative feedforward embodiments described in conjunction with FIG. 2 herein utilize upconversion of an error signal in a transmitter and downconversion of the error signal in a receiver, other embodiments of the invention could utilize downconversion of the error signal in the transmitter and upconversion of the error signal in the receiver.

Figure 1A:
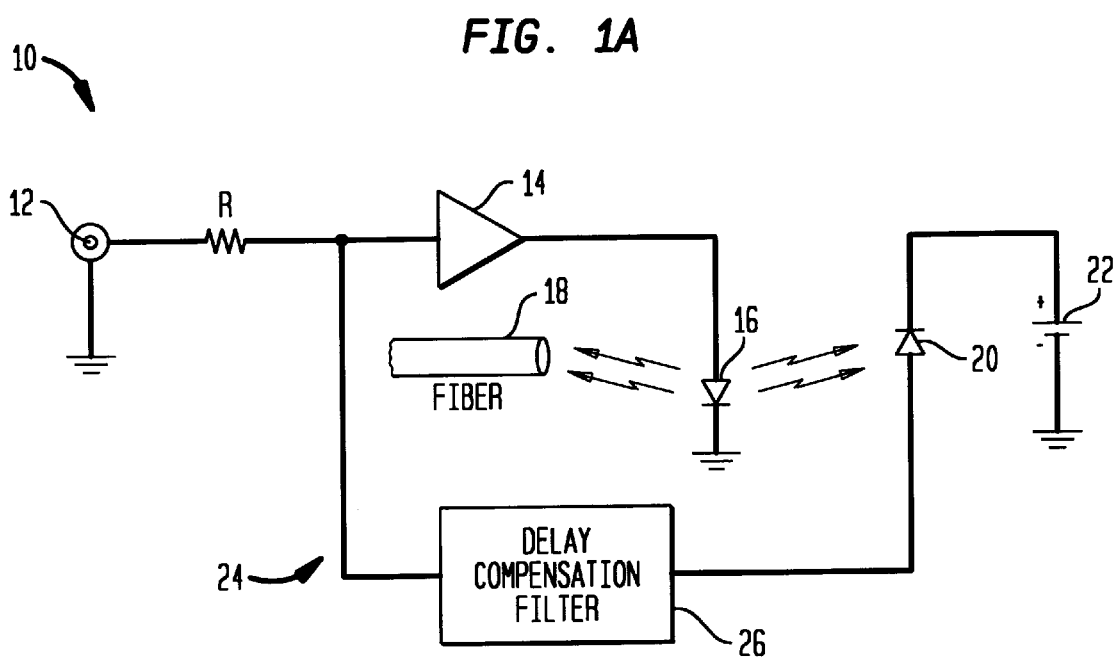
FIG. 1A shows an exemplary embodiment of the invention in which feedback is applied directly to the optical source.

FIG. 1A shows an exemplary apparatus 10 in accordance with the present invention for generating a highly-linear, low-noise optical signal using an inexpensive optical source. The apparatus 10 includes an input 12 which receives a digital or analog input electrical signal to be modulated onto an optical carrier signal. The input signal may be an analog RF video signal, a stream of digital data, or any other suitable modulation signal. The input signal is applied via a resistor R to an input of an amplifier 14. In accordance with the present invention, the amplifier 14 is configured as a single-stage amplifier or other suitable low-delay amplifier. The amplifier 14 converts the input signal to a current signal which drives a laser diode optical source 16. Although not shown in FIG. 1, those skilled in the art will recognize that laser diode 16 will be configured to include appropriate bias circuitry. The optical source in this embodiment may be a digital-grade DFB laser diode, a Fabry-Perot laser diode, or another type of inexpensive optical source. As noted above, such inexpensive optical sources generally do not exhibit sufficient linearity or sufficiently low noise to be suitable for use in analog signal transmission and other important applications. These applications have heretofore been required to utilize a substantially more expensive highly-linear, low-noise optical source. The apparatus 10 of FIG. 1A is configured such that linearity and noise performance of an inexpensive optical source, such as the laser diode 16, is improved to the point that the source can be utilized for analog signal transmission.

The laser diode optical source 16 generates an optical carrier signal which is coupled onto an optical fiber 18 as illustrated in FIG. 1A. The optical carrier signal is modulated by the signal applied to the input 12. A portion of the optical signal generated by laser diode 16 is also coupled to a high-speed positive-intrinsic-negative (PIN) photodiode 20 arranged adjacent to the laser diode 16. The photodiode 20 is biased by a voltage source 22, and generates a current in a feedback path 24 which is proportional to the amplitude of the optical signal from laser diode 16. This current is supplied as a broadband feedback signal to the input of the low-delay amplifier 14, such that it is subtracted from the input signal applied to the laser diode 16. The feedback path 24 also includes a delay compensation filter 26 arranged between the photodiode 20 and the input of the low-delay amplifier 14. The delay compensation filter 26 compensates for group delay variation across the broad bandwidth of the feedback signal in a manner to be described in greater detail below.

The photodiode 20 monitors the linearity of the laser diode 16 by detecting changes in the amplitude of the optical signal output of laser diode 16. The feedback path 24 ensures that the drive current supplied to the laser diode 16 is adjusted in accordance with the monitored optical signal amplitude, such that if the amplitude of the optical signal generated by laser diode 16 increases, the current generated by photodiode 20 increases, and the drive current supplied to laser diode 16 decreases. Conversely, if the amplitude of the optical signal decreases, the current generated by photodiode 20 decreases, and the drive current supplied to laser diode 16 increases. The feedback loop including low-delay amplifier 14, photodiode 20 and feedback path 24 thus substantially increases the linearity of the laser diode source 16, and allows it to operate over a much broader bandwidth than would otherwise be possible.

In accordance with the invention, the high-speed photodiode 20 may have a gain-bandwidth product greater than about 500 MHz. The high-speed photodiode 20 may also have a linearity which is on the order of 20 dB better than that of the laser diode 16, such that the linearity of laser diode 16 is improved by about 20 dB. Furthermore, the feedback loop also acts to eliminate the effects of noise generated by the laser diode 16. It should be noted that relatively inexpensive high-speed photodiodes, with gain-bandwidth products of as much as 2 GHz or more, are readily available. Such a photodiode when used with the low-delay amplifier in the configuration of FIG. 1A can provide laser diode 16 with an operating bandwidth on the order of several hundred MHz or more. These improvements in linearity and operating bandwidth permit an inexpensive optical source such as laser diode 16 to be utilized in a broadband analog signal transmission system, as well as in other applications which would otherwise require an expensive highly-linear, low-noise optical source.

Figure 1B:
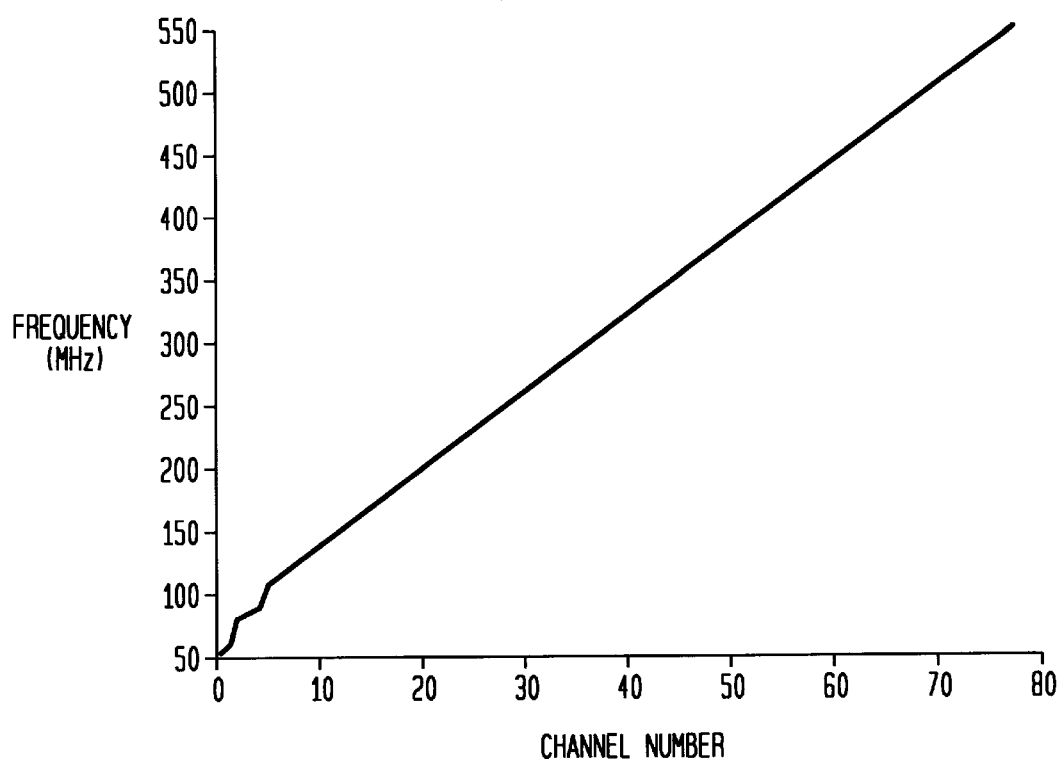
FIG. 1B shows a frequency allocation graph for television signals in a CATV system, a DBS system or other similar signal distribution system.

As noted above, the delay compensation filter 26 is used to correct for group delay variations of the feedback signal in applications in which the analog signal modulating the laser diode 16 is a broadband signal. FIG. 1B shows a frequency allocation graph for a broadband television signal distribution system such as a CATV system, indicating the frequencies assigned to particular system channels. It is apparent from FIG. 1B that the required bandwidth increases substantially linearly with the number of channels supported by the system. A CATV system configured to distribute on the order of 75 channels requires a total bandwidth on the order of 550 MHz. This broad bandwidth requirement of analog fiber transmission systems necessitates the use of the delay compensation filter 26 in the feedback path 24.

The compensation provided by filter 26 will now be described in greater detail. It will be assumed for simplicity of illustration that the signal applied to input 12 is a single frequency of the form sin ($\omega t$) and that the feedback signal is of the form $-\sin(\omega t - \omega\tau)$ where $\tau$ is the delay of the signal path including amplifier 14, diodes 16 and 20, and filter 26. The combined signal E(t) applied to the input of amplifier 14 is then given by:

$$E(t) = \sin(\omega t) - \sin(\omega t - \omega\tau) = -2\sin\left(\frac{\omega\tau}{2}\right)\cos\left(\omega t - \frac{\omega\tau}{2}\right)$$

Without the delay compensation filter 26, a delay $\tau$ on the order of 300 psec will allow the feedback path 24 to provide a 10 dB improvement in the linearity of source 16 over a broad bandwidth for input signal frequencies $f_c$ up to about 160 MHz, given that 20 log (2 sin ($\omega\tau/2$)=–10 yields $\omega\tau$=0.31 and $f_c$=0.31/(2$\pi\tau$) or 160 MHz. The delay of the feedback path thus limits the degree to which the source nonlinearity can be corrected over a broad bandwidth. The delay compensation filter 26 is used to overcome this delay-related limitation for the "comb" of higher frequency signals used in CATV signal distribution. The CATV signal comb is generally composed of a number of distinct narrowband signals, one corresponding to each channel of the system, although the entire signal comb may collectively occupy a broad bandwidth on the order of 500 MHz or more. The delay compensation filter 26 provides an amount of delay sufficient to equalize the feedback signal path for each of the individual narrowband signals of a broadband CATV system.

It will now be shown that the filter 26 is able to provide this delay compensation in the typical case in which the modulation bandwidth of the individual narrowband channel signal is small relative to its carrier frequency $f_c$. Assume that each of the narrowband signals of the CATV system at the input 12 are single sideband versions of a simple amplitude modulated (AM) signal of the form:

$$V(t) = \sin(\omega_m t) \sin(\omega_c t)$$

where $\omega_m$ is the modulation frequency and $\omega_c$ is the angular carrier frequency. The equation for the corresponding single sideband AM signal, which is the type of signal typically utilized for television signal distribution, is given by:

$$V'(t) = \sin((\omega_c + \omega_m)t)$$

The filter 26 is designed to compensate for the delay at carrier frequency $f_c$ by setting the value of $\tau$ in accordance with the following equation:

$$\tau = \frac{2\pi n}{\omega_c}$$

where n is greater than or equal to one. The delayed version $V_d'(t)$ of the single sideband signal V'(t) is given by:

$$V_d'(t) = \sin(((\omega_c + \omega_m)(t-\tau))$$

The combined signal E(t) at the input of amplifier 14 may then be expressed as:

$$E(t) = V'(t) - V_d'(t) = \sin((\omega_c + \omega_m)t) - \sin((\omega_c + \omega_m)(t-\tau))$$

which may be rewritten as:

$$E(t) = -2\sin\left((\omega_c + \omega_m)\frac{\tau}{2}\right)\cos\left((\omega_c + \omega_m)t - (\omega_c + \omega_m)\frac{\tau}{2}\right)$$

Assuming $\omega_c \gg \omega_m$ and setting $\tau = 2\pi n/\omega_c = n/f_c$ yields $E(t) \approx 0$, which indicates that error attributable to non-linearity and noise in the laser diode 16 in FIG. 1A can be corrected by the above-described feedback arrangement for a given narrowband input signal. In accordance with the invention, this type of equalization is provided for each of the narrowband signals in a given broadband CATV signal comb by altering the amount of delay provided by filter 26 at each of the narrowband signal frequencies.

Figure 1C:
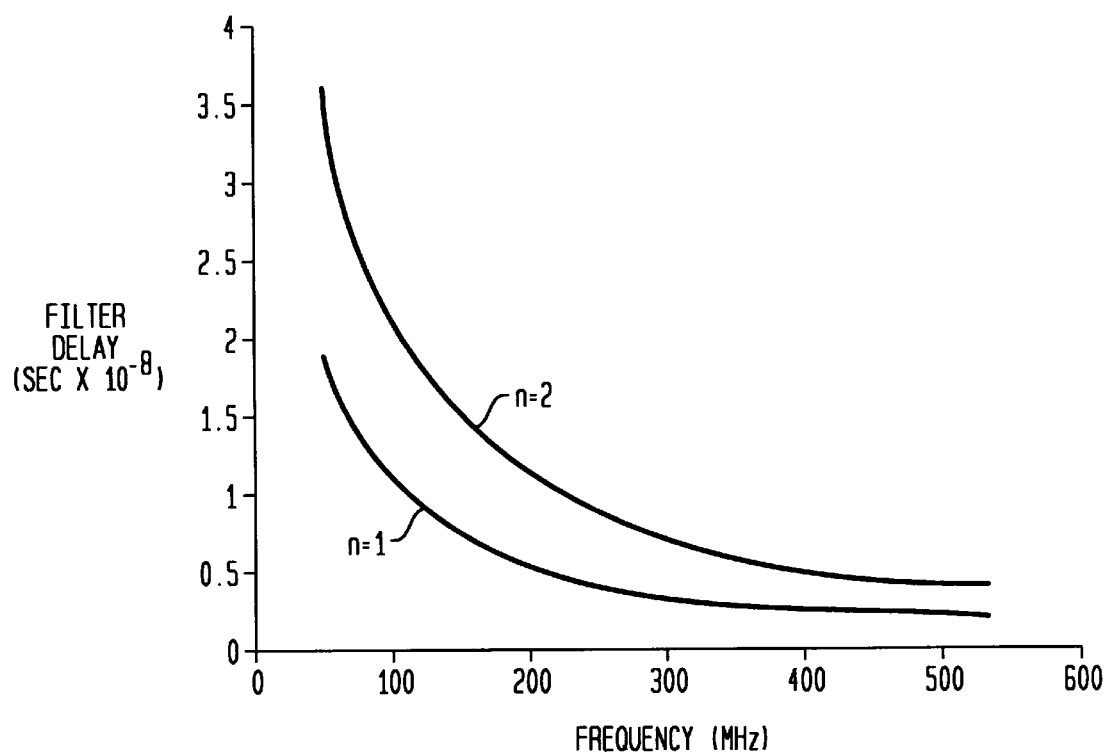
FIG. 1C shows plots of exemplary delay characteristics as a function of frequency for the delay compensation filter in the embodiment of FIG. 1A.

FIG. 1C shows two exemplary delay characteristics for the delay compensation filter 26. The characteristics plot $\tau = 2\pi n/\omega_c = n/f_c$ as a function of frequency for values of $n=1$ and $n=2$. These delay characteristics of filter 26 are designed such that the above-noted condition of $E(t) \approx 0$ is satisfied for each of a plurality of narrowband signals making up a broadband CATV signal spectrum. The amount of delay provided by the filter 26 at a given narrowband signal frequency takes into account the delay of the other elements in the signal path. It can be seen from the FIG. 1C characteristics that in order to provide a uniform delay equalization over a broadband comb of narrowband signals, the largest amounts of additional delay are required at the lowest signal frequencies. It should be noted that it may not be necessary to provide an extremely precise delay value at each of the narrowband frequencies. For example, consider a narrowband frequency of 500 MHz, and assume that a delay $\tau$ of 2.0 nsec produces $E(t) \approx 0$. If the filter 26 is configured such that a delay of 2.05 nsec is used at 500 MHz instead of the 2.0 nsec delay, the resulting error may be computed as $-2\sin(\omega_c\tau/2)$ or 0.15, which still provides an approximately 16 dB improvement in source linearity. Suitable techniques for designing filters with delay characteristics such as those shown in FIG. 1C are well known to those skilled in the art of filter design, and are therefore not described in detail herein. The above-described feedback delay compensation techniques may be used to improve optical source linearity and noise performance in a wide variety of other broadband signal transmission systems, including CATV systems configured with frequency allocations other than that shown in FIG. 1B, and direct broadcast satellite (DBS) systems such as those described in, for example, F. Baylin, "Miniature Satellite Dishes: The New Digital TV," $2^{nd}$ Edition, Baylin Publications, which is incorporated by reference herein.

Figure 2:
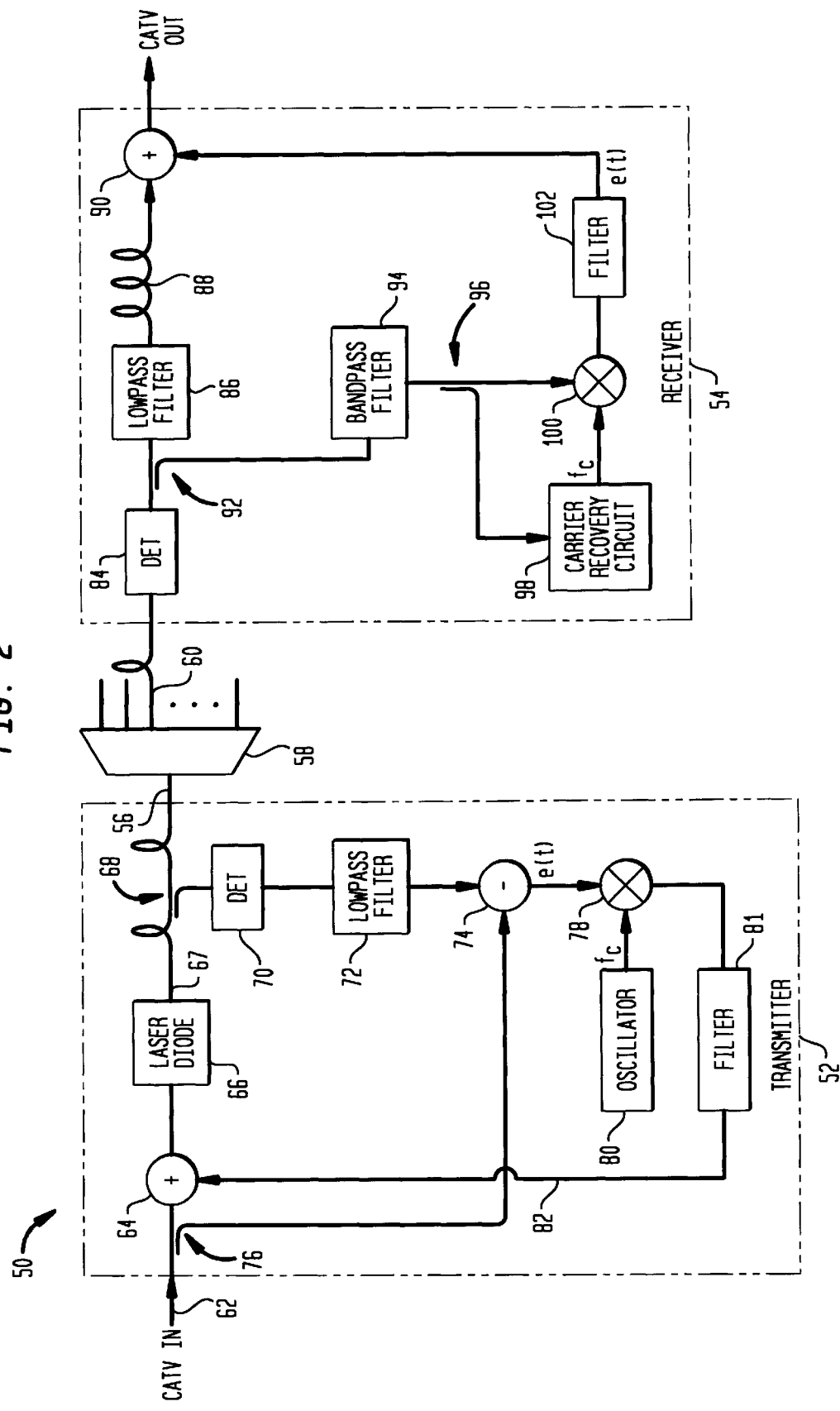
FIG. 2 shows a feedforward embodiment of the invention implemented in a transmitter and receiver of an optical signal transmission system by generating, transmitting and receiving an error signal which is characteristic of the output of an inexpensive optical source.

FIG. 2 shows another exemplary embodiment of the present invention, implemented in an optical fiber-based analog signal transmission system 50. This embodiment of the invention utilizes a feedforward technique to improve source linearity and noise performance in an optical system which includes an inexpensive optical source. The transmission system 50 includes a transmitter 52 and a receiver 54. The transmitter 52 may be located in a head end of a CATV system, such that it modulates an input CATV signal onto an optical carrier signal which is supplied via an output fiber 56 to an input of an optical signal router 58 in an optical signal distribution network used to deliver CATV signals from the head end to one or more remote receivers. The optical signal router 58 may be a passive optical splitter or another type of optical signal router. In applications in which multiple optical signals from multiple transmitters or other optical sources are multiplexed or otherwise combined for distribution, the distribution network may utilize conventional wavelength-division multiplexing (WDM) techniques. The optical router 58 directs the modulated optical signal from transmitter 52 to an optical fiber 60 connected to an input of the receiver 54. The receiver 54 demodulates the input optical carrier signal to recover the original CATV signal, which can be supplied to a CATV receiver for demodulation into one or more video or television signal channels.

Figure 3A:
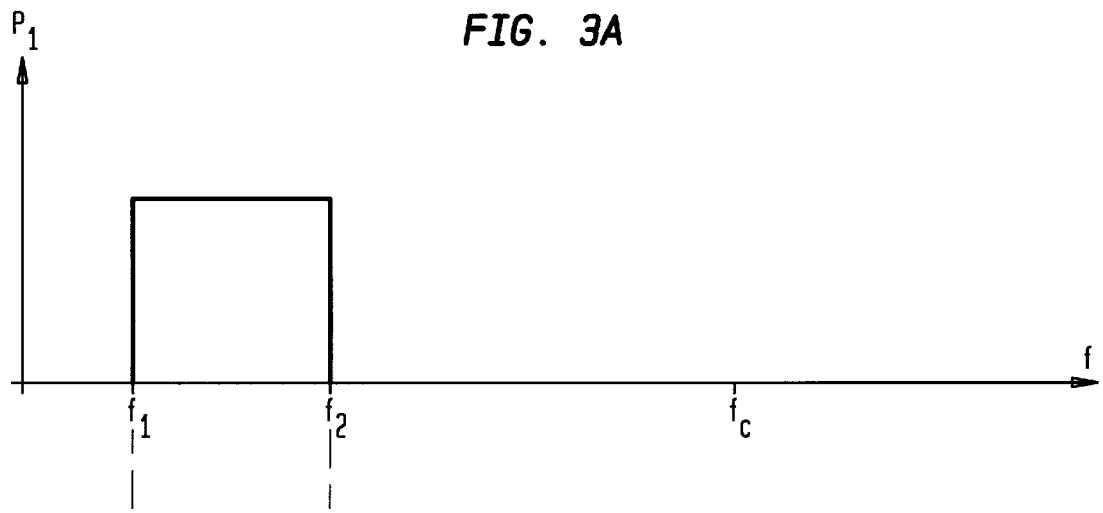
FIGS. 3A, 3B and 3C illustrate various signal spectra in the optical signal transmission system of FIG. 2.

FIG. 3A illustrates a frequency spectrum $P_1$ of an exemplary CATV signal which may be applied to a CATV input 62 of the transmitter 52 of FIG. 2. The CATV signal in this example occupies a frequency band between a first frequency $f_1$ and a second frequency $f_2$ which may be, for example, 50 MHz and 550 MHz, respectively. The input CATV signal is applied via a signal combiner 64 to an inexpensive laser diode 66 or other type of optical source. As noted previously, conventional optical transmitters for analog CATV signals are generally required to utilize expensive highly-linear, low-noise optical sources such as analog-grade DFB lasers. An optical transmitter configured in accordance with the present invention, as will be described in greater detail below, is able to operate using an inexpensive optical source such as a digital-grade DFB laser diode or Fabry-Perot laser diode. The output of the laser diode 66 is an optical signal modulated by the analog CATV input signal. The modulated output optical signal is coupled onto an optical fiber 67.

A portion of the output signal on optical fiber 67 is coupled via an optical coupler 68 to a detector 70. The detector 70 may utilize a high-speed photodiode such as photodiode 20 of FIG. 1A. The detector 70 detects the output signal from the laser diode 66 and generates an electrical signal which is proportional to the optical signal amplitude. The detected signal is filtered in a low-pass filter 72, and is applied to one input of a subtractor 74. The other input of the subtractor 74 is a portion of the input CATV signal coupled from input 12 via an RF coupler 76. The subtractor 74 generates an error signal $e(t)$ by subtracting from the output of low pass filter 72 the coupled portion of the input CATV signal. The error signal $e(t)$ in this example is upconverted in a mixer 78 to a frequency $f_c$ generated by a local oscillator 80 and filtered in a filter 81. The filtered, upconverted error signal 82 is then combined with the input CATV signal in signal combiner 64. The CATV input signal and the upconverted error signal are thus both applied to the optical source 66, and both modulate the output optical signal on fiber 67.

Figure 3B:
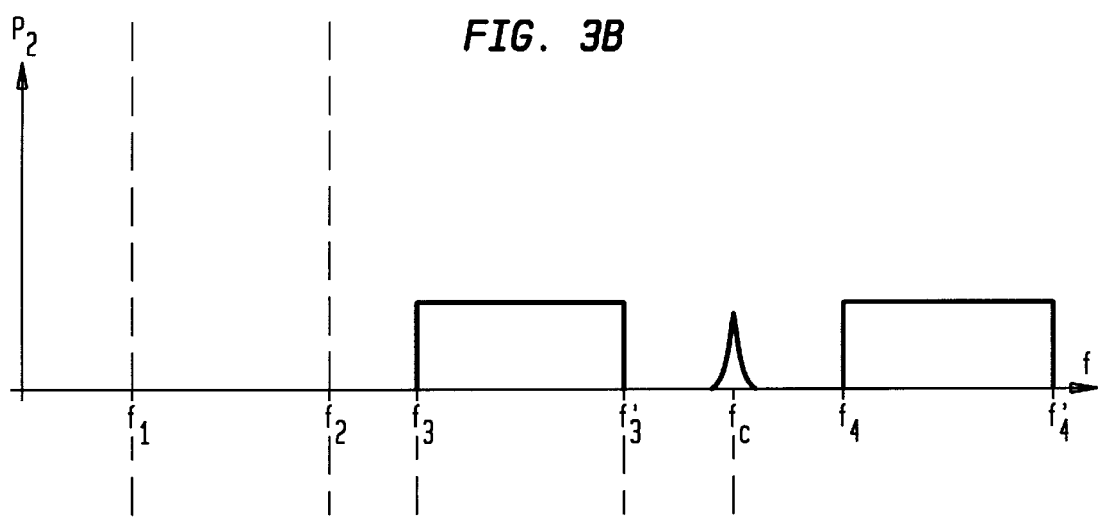

FIG. 3B shows an illustrative frequency spectrum P2 of the upconverted error signal, in an embodiment which utilizes double sideband, suppressed carrier (DSB-SC) modulation of the error signal onto the carrier frequency $f_c$. The FIG. 3B spectrum shows that the upconverted error signal in such an embodiment includes a lower sideband occupying a frequency range from $f_3$ to $f_3'$, and an upper sideband occupying a frequency range from $f_4$ to $f_4'$. It is apparent from FIG. 3B that the error signal in this illustrative embodiment is a broadband signal. The upconverted error signal frequency ranges may, but need not, be configured such that one or both of $f_3'-f_3$ and $f_4'-f_4$ are substantially equal to $f_2-f_1$. In the illustrative spectrum of FIG. 3B, the carrier signal at $f_c$ is permitted to leak slightly as shown, in order to facilitate carrier recovery in the receiver 54. Although the mixer 78 and local oscillator 80 are configured in this embodiment to upconvert the error signal, alternative embodiments may utilize a frequency converter which downconverts the error signal. For example, if the input CATV signal occupies a band between about 400 and 550 MHz, the resulting error signal could be downconverted to a frequency band which is below 400 MHz.

Figure 3C:
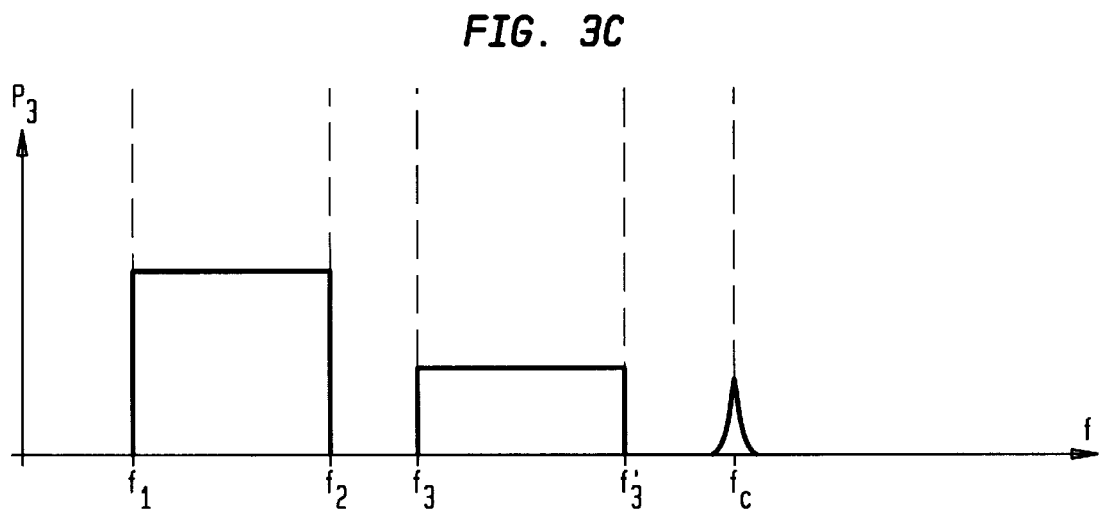

FIG. 3C shows an exemplary frequency spectrum $P_3$ illustrating the complete optical signal spectrum on fiber 56 at the output of the transmitter 52. It can be seen that the upper sideband of the upconverted error signal, occupying the frequency range from $f_4$ to $f_4'$ in FIG. 3B, has been removed by filtering in the filter 81. The filter 81 in this embodiment may thus be configured as a lowpass or bandpass filter designed to reject the upper sideband of the upconverted error signal and to provide an appropriate amount of suppression of the carrier signal at $f_c$, while passing the lower sideband in the frequency range from $f_3$ to $f_3'$. It should be noted that alternative embodiments of the invention may utilize other types of modulation techniques for the error signal. For example, double sideband techniques may be used in which both the upper and lower sidebands of the upconverted error signal are applied via the signal combiner 64 to the input of the optical source 66.

The receiver 54 receives the output optical signal generated by the transmitter 52. As noted above, this optical signal is distributed from the transmitter 52 via optical signal router 58, which may be a passive optical splitter. Other outputs of the signal router 58 may be connected to corresponding inputs of other receivers, which are not shown in FIG. 2. In alternative embodiments, a given transmitted optical signal may pass through other signal routers, including multiplexers and demultiplexers in a multiple-source WDM embodiment, before arriving at the optical fiber 60 at the input of receiver 54. The received optical signal is modulated by both the CATV signal and the above-described upconverted error signal generated in transmitter 52. The receiver 54 includes a detector 84 which, like detector 70 in transmitter 52, may be a high-speed photodiode. The detector generates an electrical signal which represents the modulation on the incoming optical signal, and has a frequency spectrum of the form shown in FIG. 3C. The CATV signal portion of the detected electrical signal is recovered by filtering in a low pass filter 86 to remove the error signal portion. After passing through a delay element 88 and a signal combiner 90, the detected CATV signal appears at the output of the receiver 54. The delay element 88 provides broadband delay equalization for the detected CATV signal, in a manner generally analogous to that described previously in conjunction with the embodiment of FIG. 1A above, although it will be apparent to those skilled in the art that the sign of the delay is different in the FIG. 1A and FIG. 2 embodiments. The delay element 88 may be replaced in an alternative embodiment with a suitable delay compensation filter.

The error signal portion of the detected electrical signal is processed by first coupling a portion of the detected signal via an RF coupler 92 to a bandpass filter 94. The bandpass filter 94 is centered at the frequency $f_c$ of the upconverted error signal, and passes the upconverted error signal spectrum while rejecting the CATV signal spectrum. The upconverted error signal at the output of the bandpass filter 94 is applied to an input of a mixer 100. The other input of the mixer 100 is the carrier frequency $f_c$ which is generated by coupling a portion of the error signal via an RF coupler 96 to a carrier recovery circuit 98. The mixer 100 downconverts the upconverted error signal, and the resulting downconverted signal is filtered in a filter 102 to recover the error signal e(t). The filter 102 serves to reject undesired mixing products in the downconverted signal at the mixer output. The recovered error signal e(f) from the output of filter 102 is supplied to an input of the signal combiner 90, and used to correct the CATV signal from the low pass filter 86. The delay element 88 serves to align the CATV signal and error signal in order to eliminate any differential delay between the CATV and error signal paths over a broad bandwidth. It should be noted that in embodiments in which it is desirable to dither the optical source 66, the upconverted error signal generated in transmitter 52 could be readily modified to provide a high-frequency dither. It is generally desirable for the dither signal to have a frequency of at least about 4 times the maximum CATV signal frequency. For example, a dither signal on the order of 2 GHz may be used in an embodiment in which the maximum CATV input signal frequency is about 500 MHz.

Combining the detected CATV signal with the detected error signal in combiner 90 substantially improves the effective linearity and noise performance of the optical source 66. As a result, an inexpensive optical source such as a laser diode may be used to deliver the broadband analog CATV signal over an optical fiber distribution system. Possible disadvantages to the approach described in conjunction with FIG. 2 include the additional electronics required in the transmitter and receiver, although the cost of this circuitry could probably be reduced to a very low level using conventional integration techniques. It should also be noted that, because of the high-frequency error signal modulation, the modulation depth of the CATV signal may have to be reduced. Also, in applications in which the optical source 66 generates nonlinear distortion which could fall into the error signal band, the upconverted error signal frequency $f_c$ may need to be placed at a fairly high frequency relative to the highest frequency $f_2$ of the analog CATV signal. For example, the upconverted error signal frequency $f_c$ may be on the order of about 4 times the frequency $f_2$. In order to accommodate such a frequency separation, the detector 84 may have to be fairly broadband. The effects of dispersion in the optical fiber of the distribution network should also be taken into account. For example, in certain applications it may be desirable to operate at or near a zero-dispersion wavelength.

The present invention permits expensive optical sources such as analog-grade DFB lasers to be replaced with substantially less expensive sources, such as digital-grade DFB laser diodes or Fabry-Perot laser diodes, without undermining the linearity and noise performance of the system. Compared to conventional pre-distortion circuits, which generally correct for only source nonlinearity, the above-described feedback and feedforward techniques correct for both nonlinearity and source noise. Moreover, the invention avoids the numerous critical adjustments required in many predistortion circuits. Compared with conventional feedforward approaches, it avoids the need for a second optical source and any wavelength-control issues associated with a second source. The above-described embodiments of the invention are intended to be illustrative only. Numerous alternative embodiments may be devised by those skilled in the art without departing from the scope of the following claims.

What is claimed is:

1. An apparatus for generating an optical signal, comprising:

an optical source having an input for receiving a modulation signal;

a detector arranged to detect a portion of an output optical signal generated by the optical source;

a feedback path between the detector and the optical source for supplying an error signal generated from the detected portion of the output optical signal to an input of the optical source; and a delay compensation filter arranged in the feedback path for providing compensation for variation in error signal delay as a function of frequency.

2. The apparatus of claim 1 wherein the optical Source is a digital-grade DFB laser diode.

3. The apparatus of claim 1 wherein the optical source is a Fabry-Perot laser diode.

4. The apparatus of claim 1 wherein the detector comprises a photodiode.

5. The apparatus of claim 4 wherein the photodiode has a gain-bandwidth product greater than or equal to about 500 MHz.

6. The apparatus of claim 1 wherein the feedback path includes a single-stage amplifier having an output connected to the input of the optical source.

7. The apparatus of claim 1 wherein the modulation signal is an analog CATV signal.

8. An apparatus for generating an optical signal, comprising:
   an optical source having an input for receiving a modulation signal;
   a detector arranged to detect a portion of an output optical signal generated by the optical source;
   a first signal combiner having an output coupled to an input of the optical source, and a first input connected to receive the modulation signal;
   a second signal combiner having a first input coupled to an output of the detector;
   a coupler for coupling a portion of the modulation signal to a second input of the second signal combiner, such that the second signal combiner generates an error signal; and
   a frequency converter having an input coupled to an output of the second signal combiner for converting the error signal to a particular frequency band, wherein the converted error signal is supplied to a second input of the first signal combiner such that both the modulation signal and the converted error signal are applied to the optical source.

9. The apparatus of claim 8 further including a low pass filter coupled between the output of the detector and the second input of the second signal combiner.

10. The apparatus of claim 8 wherein the frequency converter includes a local oscillator for generating a carrier signal, and a mixer for mixing the error signal with the carrier signal.

11. The apparatus of claim 8 wherein only one of an upper sideband and a lower sideband of the converted error signal is applied to the optical source.

12. The apparatus of claim 8 wherein both an upper sideband and a lower sideband of the converted error signal are applied to the optical source.

13. A method for generating an optical signal in an optical source, comprising:
   detecting a portion of an output optical signal generated by the optical source;
   supplying an error signal generated from the detected portion of the output optical signal to an input of the optical source via a feedback path; and
   compensating for variation in the delay of the error signal as a function of frequency, such that the error signal provides improved source linearity over a desired bandwidth.

14. The method of claim 13 wherein the optical source is a digital-grade DFB laser diode.

15. The method of claim 13 wherein the optical source is a Fabry-Perot laser diode.

16. The method of claim 13 wherein the detector comprises a photodiode.

17. The method of claim 16 wherein the photodiode has a gain-bandwidth product greater than or equal to about 500 MHz.

18. The method of claim 13 wherein the feedback path includes a single-stage amplifier having an output connected to the input of the optical source.

19. The method of claim 13 wherein the modulation signal is an analog CATV signal.

20. A method of generating an optical signal in an optical source, comprising:
   detecting a portion of an output optical signal generated by the optical source;
   combining an output of a detector with a coupled portion of a modulation signal to generate an error signal;
   converting the error signal to a particular frequency band; and
   applying at least a portion of the converted error signal and the modulation signal to the input of the optical source.

21. The method of claim 20 wherein the combining step includes filtering the output of the detector in a low pass filter before combining it with the coupled portion of the modulation signal.

22. The method of claim 20 wherein the converting step includes mixing the error signal with a carrier signal generated by a local oscillator.

23. The method of claim 20 wherein the applying step includes applying only one of an upper sideband and a lower sideband of the converted error signal to the optical source.

24. The method of claim 20 wherein the applying step includes applying both an upper sideband and a lower sideband of the converted error signal to the optical source.

* * * * *